United States Patent Office 3,275,945

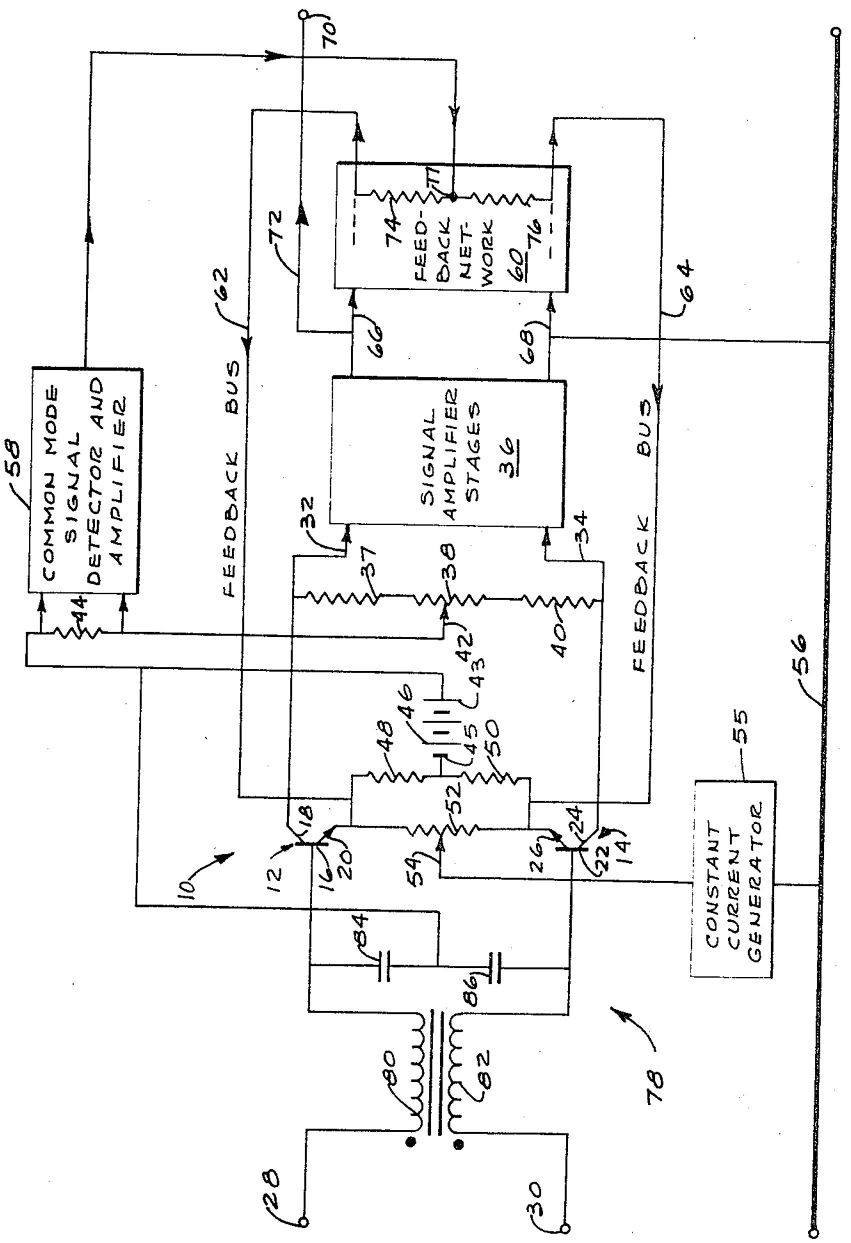
NORMAN C. WALKER
CHARLES E. ENGLE
INVENTORS.
BY
Nilsson & Robbins
ATTORNEYS.

Patented Sept. 27, 1966

3,275,945

DIRECT COUPLED DIFFERENTIAL AMPLIFIER WITH COMMON MODE REJECTION

Norman C. Walker, Newport Beach, and Charles E. Engle, Tustin, Calif., assignors to Dana Laboratories, Inc., Santa Ana, Calif., a corporation of California Filed June 4, 1963, Ser. No. 285,422
8 Claims. (Cl. 330—30)

This invention relates generally to electrical amplifiers and more particularly to low frequency and direct current amplifiers which detect and amplify signals manifest as differential currents or voltages associated with a pair of conductors each of which is distinct from a ground or common conductor.

Such differential amplifiers find wide utilization in modern technology; for example, they are particularly frequently used in instrumentation applications where such parameters as strain or temperature or the like are sensed; and electrical signals carrying the information are sent to an instrument location where they are detected, amplified, analyzed, or, in some manner, recorded or observed.

The art of differential amplifiers, for such purposes generally, may be said to be relatively highly developed. In this connection, for example, differential amplifiers operable at low frequencies or direct current and stabilized either electrically or mechanically, as by chopper techniques, are known which exhibit very high sensitivity and which have satisfactory other electrical characteristics such as response time, overload recovery, low temperature coefficient, and independence from power supply fluctuations.

One troublesome aspect, however, of the heretofore available differential, direct coupled amplifier and detection systems that has not been satisfactorily solved in the known art, is that typically the elongated leads between the amplifier and the sensor are vulnerable to noise signal pick-up, particularly due to the finite area of the circuit loop formed by the sensor leads and the common bus. These noise signals are known generically as the common mode signal and are caused by induction and radiation fields of nearby equipment, line coupling to other conductors, and a multitude of other source including galvanic or other electrochemical effects, atmospheric electrical radiations, and even extra-atmospheric radiations as in the form of cosmic rays.

A large proportion of these "static" type of noises are at radio frequencies and are particularly troublesome in a direct coupled amplifier. Particularly deleterious is their tendency to saturate the amplifier and cause its output to be erratic and, often, totally useless for significant periods of time. Prior art attempts to obviate this difficulty have typically been directed toward input filters which effectively shorted to common any signal above a certain low-pass frequency. Such approaches, however, always necessitate a compromise on the upper frequency limit of the system and, more importantly, always load the input leads with undesired reactance paths to common. Furthermore, the shunt capacitance to common tends to destroy whatever other common mode rejection capability the amplifier has, particularly with unbalanced sources.

It is therefore an object of the present invention to provide a differential, direct-coupled amplifier which is not subject to these and other disadvantages and limitations of the prior art.

It is another object to provide such an amplifier which includes an improved common mode rejection capability.

It is another object to provide such an amplifier which rejects radio frequency common mode signals with sacrifice neither of differential signal frequency response nor of other common mode rejection capability.

It is another object to provide a system for rejecting such common mode signals which is mechanically rugged and simple, inexpensive, electrically stable, and free from maintenance requirements.

These and other objects and advantages are achieved in accordance with the structural features of an example of the invention which includes a feedback controlled, dual transistor input stage, the base electrodes of the two transistors forming the input terminals to the stage and each of the bases being electrically distinct from a common bus. Any signals suffered in common, i.e. common mode signals, by the two bases are detected in a common collector circuit and are fed back to the emitters to cause effectively a rejection of the common signal. Additional rejection is achieved by virtue of the nature of the particular differential amplifier, as discussed in more detail below, which tends to "see," by definition, only differential signals as, for example, by requiring that the combined current through the two input transistors be constant and by detecting and amplifying any differenec current.

In this example of the invention, some fluctuation in the summed collector current of the two input transistors is permitted and the fluctuations are used to generate a balanced feedback which is impressed upon a circuit mode electrically equidistant from the emitters to counteract and cancel the in-common signal on the base electrodes of the transistors.

Because of this counteracting, the emitter voltages tend to move such that their changes in value match that of the common mode voltage. That is, the emitters follow the common mode voltage. Therefore any point which is connected in a symmetric manner to the emitter also tends to follow the common mode voltage, provided there is no appreciable load or current flow to the common bus or to points which are in turn connected thereto.

Such points connected symmetric to the emitters and not otherwise loaded to common will be called herein common mode wise, intermediate the emitters. It should be understood that these points are intermediate the emitters within the bandwidth of the amplifier.

The radio frequency common mode rejection apparatus includes a bifilar inductor having a winding interconnected respectively between an input terminal of the amplifier and its associated base electrode of one of the input transistors. A capacitor is connected between each of the base electrodes and a point intermediate the emitters. In this manner radio frequency input signals common to both input terminals are effectively shorted around the input transistors, and thereby rejected, without the addition of any capacitive coupling, or other loading, between either of the input leads and the common bus.

The features of this invention which are believed to be novel and patentable are set forth in the claims which form a part of this specification. However, further details of the features pointed out in the above brief example and other novel features and their operation as well as additional objects and advantages will become apparent to one skilled in the art and be best understood from a consideration of the following description taken in connection with the accompanying drawing which is presented by way of illustrative example only and in which:

The single figure is a schematic diagram of an example of a differential amplifier constructed in accordance with the principles of the present invention.

Referring more specifically to the figure, there is shown in the indicated example a number of specific details. However, the particular detailed showing is chosen and presented only for the purposes of clarity and a ready understanding of the principles of the invention, and is not intended to be taken as a limitation of the scope of the invention which is measured by the appended claims.

In the figure of the invention there is a differential amplifier chosen, for illustration, which is, in large measure, of the character described in the pending application entitled, Direct Coupled Amplifier for Amplifying Low Level Information Signals and Rejecting Interference Signals, Serial No. 257,188, filed February 8, 1963, by N. B. Braymer and C. E. Engle, and assigned to the assignee of the present application, issued June 15, 1965, as Patent No. 3,189,840. For detailed discussion of the more basic aspects of the amplifier portions shown in the earlier application, the reader is referred thereto; and, in the cause of brevity and effort toward conciseness, the following detailed discussion will be mainly directed toward the presently claimed, new combination.

The input stage 10 of the amplifier is seen to include a pair of dual input transistors 12, 14 each of which has base, collector, and emitter electrodes referenced respectively as 16, 18, 20 for the transistor 12 and 22, 24, 26 for the transistor 14. The base electrodes 16, 22 are each coupled to a respective one of a pair of input terminals 28, 30; while the collector electrodes 18, 24 are each coupled to a respective one of a pair of input terminals 32, 34 of subsequent signal amplifier stages 36. A series resistive circuit is connected between the collectors 18, 24 and includes, in this example, a collector load resistor 37, the resistance element of a potentiometer 38, and a collector load resistor 40. The movable arm 42 of the potentiometer 38 is coupled through a summing resistor 44 to one terminal 43 of a source of potential such as a battery 46, the opposite terminal 45 of which is connected symmetrically to each of the emitter electrodes 20, 26 through a respective resistor 48, 50. Another resistive circuit connected between the emitters 20, 26 includes the resistance element of a potentiometer 52, the movable arm 54 of which is shown connected to one terminal of a constant current generator 55. The other terminal of the constant current generator is connected to a common bus 56.

The signal amplifier stages 36 indicated in this example as well as a common mode signal detector and amplifier 58 may be conventional amplifiers appropriate to the particular utilization of the invention combination, but generally it is preferred that they be transistorized differential amplifiers. Similarly a feedback network 60 suitably adaptable to provide balanced feedback signals to the emitters 20, 26 along respective feedback busses 62, 64. The input terminals 66, 68 of the feedback network 60 are coupled to corresponding ones of the output terminals of the last one of the signal amplifier stages 36; in this example the last such stage forms a single ending stage such that the terminal 68 is referenced to the common bus 56 and the terminal 66 being connected to the other output terminal 70 by way of a lead 72.

The input signal to the common mode signal detector and amplifier 58 is derived from the combined collector current flow through the summing resistor 44. The operation of the amplifier 58 is to provide, as taught in the above referenced copending application, a bucking or compensating voltage which, in a negative feedback relation, is applied to the feedback network 60 from whence it is fed through, in this example, a symmetrical pair of resistors 74, 76 at their junction or node 77 to the feedback busses 62, 64 respectively. Again the detailed operation of such a feedback arrangement including the cooperation of its several inputs is supplied in the referenced application and is not repeated here since it is not considered essential to the understanding of the present invention.

An important aspect of the present combination is a filter system 78 which provides a novel capability for rejecting radio frequency components from the common mode signal without loading the input terminals 28, 30 to the common bus 56, without requiring the transistors 12, 14 to handle them. To this end an inductive winding 80, 82 is intercoupled between each of the base electrodes 16, 22 and its associated input terminal 28, 30. In this example, for reasons including compactness, identitv of characteristics (for symmetry), minimum leakage inductance, ease of assembly, and others, the winding is a unitary bifilar inductor connected, as shown, with the same polarity.

Connected to each of the base electrodes 16, 22 is, respectively, a capacitor 84, 86, the electrical parameters of which are chosen to cooperate with those of its associated inductive winding 80, 82 in a low pass filter relationship to reject, as desired, the radio frequency components of the common mode signal from the input transistors and effectively to cause such components to bypass the transistors thus avoiding the deleterious effects therein noted above. It is of particular importance to note that this is accomplished, in accordance with the principles of the invention, by returning capacitors 84, 86 not to ground or to common bus 56, but to another circuit point disposed electrically substantially common mode wise intermediate the emitter electrodes 20, 26. In this example such a point is battery terminal 43. Alternatively any one of several other points may be chosen for this purpose. The opposite battery terminal 45, the movable arm 42 of the potentiometer 38, the movable arm 54 of the potentiometer 52 each could so be utilized as desired.

Another alternate arrangement is formed by connecting the capacitor from base to emitter, e.g. the capacitor 84 is connected from the base 16 to the emitter 20; and the capacitor 86 from the base 22 to the emitter 26.

Briefly the operation of the remainder of the amplifier system is as follows: non-radio frequency common mode signals are passed by the filter system 78 and are impressed upon the base electrodes 16, 22 in-common. Their result, depending upon their instantaneous polarity, is to cause either an increase or decrease current fluctuation through the summing resistor 44 which in turn causes the common mode detector and amplifier 58 to generate a corresponding negative feedback signal at the common feedback point, circuit node 77. This feedback is applied through the feedback busses 62, 64 to the emitters 20, 26 to counteract the previous conduction change tendency due to the common mode signal on the base. Thus the differential signal across the collectors (terminals 32, 34) is not altered and the change in their absolute voltage levels is minimized.

A differential signal on the base electrodes, on the other hand, does not alter the current through the summing resistor 44 but does affect the current balance between the two transistors and does, consequently, create a differential voltage signal across the leads 32, 34. This differential signal is then treated by the subsequent differential amplifier stages 36 and coupled to the output terminal pair 70, 56. Any resulting feedback from the desired signal information, as discussed in the referenced pending application, may be supplied from the feedback network 60 and may be of whatever nature desired (e.g. positive or negative) for a particular utilization of the invention.

In order particularly to balance the input stage 10 with respect to different ambient temperature, the transistors 12, 14 may be selected for matched temperature characteristics, the base electrodes 16, 22 may be shorted together, the emitter electrodes 20, 26 shorted together, and the movable arm 42 of the potentiometer 38 adjusted for zero voltage differential between terminals 32, 34. Then the emitters may be unshorted, and the potentiometer 52 adjusted, to zero again the differential collector voltage. This causes the base-emitter voltage drops of the transistors 12, 14 to be equal at one temperature and has been discovered to reduce the differential temperature coefficient drift of the amplifier stage 10 substantially to zero, so long as the ambient temperatures for both transistors are maintained equal to each other. Consequently no error signal is generated as a result of inherent differences in the structural nature of the two transistors.

That has thus been disclosed an example of a direct-coupled common mode rejecting amplifier which achieves the objects and exhibits the advantages pointed out and discussed hereinabove.

What is claimed is:

1. A direct coupled differential amplifier having a pair of amplifier input terminals and a common bus and comprising: a dual transistor input stage including two substantially symmetrically intercoupled transistors each having an input electrode coupled to a respective one of said amplifier input terminals and being of the character sensitive to differential signals on said amplifier input terminals for providing output signals representative thereof; a common mode signal detector and amplifier coupled to said input stage and being responsive to common mode signals on said input terminals to generate a negative feedback signal and to impress it upon a circuit point intercoupled electrically between and equidistant from a like electrode of each of said transistors; an inductive winding intercoupled between each said input electrode of said dual transistors and a respective one of said input terminals; and a filter capacitor intercoupled between each of said inductive windings and said circuit point.

2. A differential amplifier having dual input terminals and comprising: a balanced dual input transistor stage which includes a pair of transistors each having a base electrode coupled to a respective one of the dual input terminals; a common mode signal detector means having an input terminal coupled to said pair of transistors and being of the character to generate a feedback signal representative of the instantaneous magnitude of a common mode signal on said base electrodes; means for coupling said feedback signal to a gain control point intercoupled between and electrically substantially equidistantly from like electrodes of respective ones of said transistors; an inductive winding intercoupled between each of said base electrodes and a respective one of said dual input terminals, the two inductive windings having a predetermined mutual inductance; and a capacitor coupled between each of said base electrodes and said gain control point, each of the capacitors having a capacity to cooperate in a predetermined radio frequency filter relationship with one of said inductive windings.

3. A direct-coupled differential amplifier comprising: a pair of input terminals; a common bus; an input stage including a pair of transistors each having base and emitter and collector electrodes, an emitter resistive circuit coupled between the emitter electrodes of said transistors and having a center tap, a collector resistive circuit connected between the collectors of said transistors and having a center tap, a source of potential coupled between said center tap of said collector resistive circuit and said center tap of said emitter resistive circuit; at least one differential signal amplifier stage, the first thereof having input terminals coupled respectively to said collector electrodes of said transistors; a feedback network coupled to output terminals of the last of said at least one amplifier stage and having a pair of feedback busses each coupled to a respective one of said emitter electrodes of said transistors; a pair of resistors coupled in series between said feedback busses and defining at their junction a circuit node; a pair of inductive windings individual ones thereof being intercoupled between a respective one of said base electrodes and a respective one of said first mentioned input terminals; and a pair of capacitors having a radio frequency low pass filter relationship with respect to said inductive windings intercoupled between respective ones thereof and said circuit node.

4. A direct-coupled differential amplifier comprising: a pair of input terminals; a common bus; an output terminal; an input stage including a pair of transistors each having base and emitter and collector electrodes; an emitter resistive circuit connected between the emitter electrodes of said transistors and having a center tap; a collector resistive circuit connected between the collectors of said transistors and having a center tap; a source of potential coupled in series between said center tap of said collector resistive circuit and said center tap of said emitter resistive circuit; a common mode signal detector and amplifier means having input terminals coupled to said collector electrodes and having an output terminal; at least one differential signal amplifier stage, the first thereof having input terminals coupled respectively to said collector electrodes of said transistors; a feedback network coupled to output terminals of the last of said at least one amplifier stage and having a pair of feedback busses each coupled to a respective one of said emitter electrodes of said transistors; a pair of resistors coupled in series between said feedback busses and defining at their junction a circuit node, said output terminal of said common mode signal detector and amplifier being coupled to said circuit node; a pair of inductive windings, individual ones thereof being intercoupled between a respective one of said base electrodes and a respective one of said first mentioned input terminals; and a pair of capacitors each having a radio frequency low pass filter relationship with respect to said inductive windings and being intercoupled between respective ones thereof and said circuit node.

5. A direct-coupled differential amplifier comprising: a pair of input terminals; a common bus; an input stage including a pair of transistors each having base and emitter and collector electrodes; an emitter resistive circuit connected between the emitter electrodes of said transistors and having a center tap; a collector resistive circuit connected between the collectors of said transistors and having a center tap; a summing resistor and a source of potential coupled in series between said center tap of said collector resistive circuit and said center tap of said emitter resistive circuit, said center tap of said emitter resistive circuit being coupled to said common bus; a common mode signal detector and amplifier means having input terminals coupled across said summing resistor and having an output terminal; at least one differential signal amplifier stage, the first thereof having input terminals coupled respectively to said collector electrodes of said transistors; a feedback network coupled to output terminals of the last of said at least one amplifier stage and having a pair of feedback busses each coupled to a respective one of said emitter electrodes of said transistors; a pair of resistors coupled in series between said feedback busses and defining at their junction a circuit node, said output terminal of said common mode signal detector and amplifier being coupled to said circuit node; a pair of inductive windings, individual ones thereof being intercoupled between a respective one of said base electrodes and a respective one of said first mentioned input terminals; and a pair of capacitors each having a radio frequency low pass filter relationship with respect to said inductive windings and being intercoupled between respective ones thereof and said circuit node.

6. The invention according to claim 5 in which said capacitors are each connected to a respective one of said base electrodes.

7. The invention according to claim 5 in which said inductive windings constitute a mutually inductively coupled bifilar inductor.

8. A direct-coupled differential amplifier comprising: a pair of input terminals; a common bus; an output terminal; an input stage including a pair of transistors each having base and emitter and collector electrodes; first and second emitter resistive circuits connected in parallel between the emitter electrodes of said transistors and each having a center tap; a collector resistive circuit connected between the collectors of said transistors and having a center tap; a summing resistor and a source of potential coupled in series between said center tap of said collector resistive circuit and said center tap of said first emitter resistive circuits, said center tap of said emitter resistive circuit being coupled to said common bus; a common mode signal detector and amplifier means having input terminals coupled across said summing resistor and having an output terminal; at least one differential signal amplifier stage, the first thereof having input terminals coupled respectively to said collector electrodes of said transistors; a feedback network coupled to output terminals of the last of said at least one amplifier stage and having a pair of feedback busses each coupled to a respective one of said emitter electrodes of said transistors; a pair of resistors coupled in series between said feedback busses and defining at their junction a circuit node, said output terminal of said common mode signal detector and amplifier being coupled to said circuit node; a bifilar inductor, the individual inductive windings thereof being intercoupled between a respective one of said base electrodes and a respective one of said first mentioned input terminals; and a pair of capacitors each having a radio frequency low pass filter relationship with respect to said inductive windings and being intercoupled between respective ones thereof and said circuit node.

References Cited by the Examiner

UNITED STATES PATENTS

| | | | |
|---|---|---|---|
| 2,930,985 | 3/1960 | Basharrah | 330—30 X |
| 3,036,274 | 5/1962 | Greatbatch. | |
| 3,046,487 | 7/1962 | Matzen et al. | 330—28 X |
| 3,168,708 | 2/1965 | Stuart-Williams et al. | |

ROY LAKE, *Primary Examiner.*

F. D. PARIS, *Assistant Examiner.*